United States Patent
Kim

(10) Patent No.: US 11,584,356 B2
(45) Date of Patent: Feb. 21, 2023

(54) METHOD AND DEVICE FOR CONTROLLING CHARGING OF VEHICLE BATTERY

(71) Applicants: HYUNDAI MOTOR COMPANY, Seoul (KR); Kia Corporation, Seoul (KR)

(72) Inventor: Yong Hyun Kim, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 54 days.

(21) Appl. No.: 17/406,455

(22) Filed: Aug. 19, 2021

(65) Prior Publication Data

US 2022/0176940 A1 Jun. 9, 2022

(30) Foreign Application Priority Data

Dec. 4, 2020 (KR) .................. 10-2020-0168905

(51) Int. Cl.
*B60W 20/13* (2016.01)
*H02J 7/00* (2006.01)
(Continued)

(52) U.S. Cl.
CPC ............ *B60W 20/13* (2016.01); *B60L 53/24* (2019.02); *B60L 58/15* (2019.02); *B60W 10/02* (2013.01); *B60W 10/30* (2013.01); *B60W 20/40* (2013.01); *F02N 11/04* (2013.01); *F02N 11/0859* (2013.01); *H02J 7/007188* (2020.01); *B60W 2510/0638* (2013.01);
(Continued)

(58) Field of Classification Search
None
See application file for complete search history.

(56) References Cited

U.S. PATENT DOCUMENTS 10,308,118 B2 * 6/2019 Arakawa ............ H02P 29/0241
10,513,258 B2 * 12/2019 Yamaguchi ......... B60W 50/023
(Continued)

FOREIGN PATENT DOCUMENTS

CN 101346252 A * 1/2009 ............. B60K 6/445
CN 101952152 A * 1/2011 ............... B60K 6/48
(Continued)

*Primary Examiner* — Kevin R Steckbauer
(74) *Attorney, Agent, or Firm* — Morgan, Lewis & Bockius LLP

(57) ABSTRACT

A method of controlling charging of a battery may include making, by a controller, the battery that supplies power to a drive motor start to be charged with a boosted voltage higher than a voltage of a fast charger by controlling a switch connecting the drive motor and the fast charger of a vehicle and a switch of an inverter driving the drive motor, for fast charging of the battery; determining, by the controller, whether a motor position sensor has failure according to an output signal of the motor position sensor which detects a position of the drive motor; engaging, by the controller, an engine clutch that is configured to connect or disconnect the engine of the vehicle and the drive motor, when the controller determines that the motor position sensor has the failure; and maintaining, by the controller, the fast charging for the battery when a rotation of the drive motor stops after the engine clutch is engaged.

19 Claims, 4 Drawing Sheets

(51) Int. Cl.
*B60W 10/30* (2006.01)
*B60W 10/02* (2006.01)
*F02N 11/04* (2006.01)
*B60W 20/40* (2016.01)
*F02N 11/08* (2006.01)
*B60L 58/15* (2019.01)
*B60L 53/24* (2019.01)

(52) U.S. Cl.
CPC ... *B60W 2510/081* (2013.01); *B60W 2510/30* (2013.01); *F02D 2200/101* (2013.01); *F02N 2200/022* (2013.01); *F02N 2200/041* (2013.01)

(56) References Cited

U.S. PATENT DOCUMENTS

| | | | |
|---|---|---|---|
| 10,714,946 B2* | 7/2020 | Götz | B60L 53/16 |
| 2005/0082096 A1* | 4/2005 | Oono | F16H 63/483 |
| | | | 903/910 |
| 2009/0020092 A1* | 1/2009 | Kishibata | F02N 11/101 |
| | | | 123/179.5 |
| 2018/0056984 A1* | 3/2018 | Yamaguchi | B60W 20/50 |
| 2018/0281596 A1* | 10/2018 | Arakawa | H02P 6/18 |
| 2019/0109462 A1* | 4/2019 | Götz | B60L 53/16 |
| 2022/0176940 A1* | 6/2022 | Kim | B60K 6/387 |

FOREIGN PATENT DOCUMENTS

| | | | | | |
|---|---|---|---|---|---|
| CN | 101346252 | B | * | 6/2011 | ............ B60K 6/445 |
| CN | 101952152 | B | * | 5/2014 | ............ B60K 6/48 |
| CN | 107428335 | A | * | 12/2017 | ............ B60K 6/485 |
| CN | 107813695 | A | * | 3/2018 | ............ B60K 6/48 |
| CN | 106458206 | B | * | 8/2018 | ............ B60K 6/48 |
| CN | 107428335 | B | * | 4/2020 | ............ B60K 6/485 |
| CN | 108667368 | B | * | 5/2021 | ............ B60K 6/445 |
| CN | 114604232 | A | * | 6/2022 | ............ B60W 10/02 |
| DE | 112015006459 | T5 | * | 12/2017 | ............ B60K 6/485 |
| DE | 102014009715 | B4 | * | 7/2018 | ............ B60K 6/48 |
| DE | 102021211151 | A1 | * | 6/2022 | ............ B60W 10/02 |
| EP | 3160785 | B1 | * | 1/2019 | ............ B60K 6/48 |
| JP | 3617304 | B2 | * | 2/2005 | ............ B60K 6/28 |
| JP | 3846118 | B2 | * | 11/2006 | |
| JP | 2007203876 | A | * | 8/2007 | ............ B60K 6/445 |
| JP | 2010018183 | A | * | 1/2010 | ............ B60K 6/34 |
| JP | 2010023759 | A | * | 2/2010 | ............ B60K 6/365 |
| JP | 4430723 | B2 | * | 3/2010 | ............ B60K 6/365 |
| JP | 4450095 | B2 | * | 4/2010 | ............ B60K 6/34 |
| JP | 5200116 | B2 | * | 5/2013 | ............ B60K 6/48 |
| JP | 2018166382 | A | * | 10/2018 | ............ B60K 6/445 |
| JP | 6743740 | B2 | * | 8/2020 | ............ B60K 6/445 |
| KR | 10-2019-0040120 | A | | 4/2019 | |
| WO | WO-2016166884 | A1 | * | 10/2016 | ............ B60K 6/485 |

* cited by examiner

METHOD AND DEVICE FOR CONTROLLING CHARGING OF VEHICLE BATTERY

CROSS-REFERENCE TO RELATED APPLICATION

The present application claims priority to Korean Patent Application No. 10-2020-0168905 filed on Dec. 4, 2020, the entire contents of which is incorporated herein for all purposes by this reference.

BACKGROUND OF THE INVENTION

Field of the Invention

The present invention relates to a vehicle, and more particularly, to a method and a device for controlling charging of a vehicle battery.

Description of Related Art

An electric vehicle utilizes a battery pack as a power source, and utilizes a motor which is an electric motor driven by a voltage of the battery pack to generate driving force, and the motor operates as a motor in the case where power is supplied from a battery and operates as a power generator when the vehicle brakes, so that the motor converts regenerative energy generated during braking into electrical energy and supplies the converted electrical energy to the battery pack as charging voltage.

The battery pack mounted to the electric vehicle is generally formed of 25 or more modules which are connected in series, and in the case where a State of charge (SOC) value of the battery pack cannot secure stable driving to a destination after the end of operation or during operation, the battery pack is charged by use of a commercial power source.

An environment-friendly vehicle, such as an Electric Vehicle (EV) or a Plug-In Hybrid Electric Vehicle (PHEV), utilizes Electric Vehicle Supply Equipment (EVSE) provided in a charging station to charge a battery.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a method and a device configured for controlling charging of a vehicle battery, which are configured for maintaining fast charging of a battery when a drive motor rotates during fast charging of the battery of a vehicle.

Various aspects of the present invention are directed to providing a method of controlling charging of a battery, the method including: making, by a controller, a battery that supplies power to the driving motor start to be charged with a boosted voltage higher than a voltage of a fast charger by controlling a switch connecting a driving motor and a fast charger of a vehicle and a switch of an inverter driving the driving motor; determining, by the controller, whether a motor position sensor has failure according to an output signal of the motor position sensor which detects a position of the driving motor; engaging, by the controller, an engine clutch that connects or disconnects the engine of the vehicle and the driving motor when the motor position sensor has the failure; and maintaining, by the controller, the fast charging for the battery when a rotation of the driving motor stops after the engine clutch is engaged.

The method of controlling charging of the vehicle battery may further include: when the controller determines that the rotation of the drive motor does not stop after the engine clutch is engaged, determining, by the controller, whether a speed of a starter-generator connected to the engine is equal to or greater than a first reference speed for controlling generation; and when the controller determines that the speed of the starter-generator is less than the first reference speed, maintaining, by the controller, the fast charging for the battery.

The method of controlling charging of the vehicle battery may further include: before the determining whether the speed of the starter-generator is equal to or greater than the first reference speed, determining, by the controller, a rotation direction of the starter-generator according to an output signal of a generator position sensor that detects a position of the starter-generator, in which when the rotation direction of the starter-generator is a direction corresponding to a reverse direction of the vehicle, the controller may stop the fast charging of the battery.

The method of controlling charging of the vehicle battery may further include when the controller determines that the speed of the starter-generator is equal to or greater than the first reference speed, charging, by the controller, the battery by controlling the starter-generator, and maintaining the fast charging of the battery.

The method of controlling charging of the vehicle battery may further include when the battery is charged by the starter-generator, determining, by the controller, whether the speed of the starter-generator is equal to or greater than a second reference speed for stopping control of generation, in which when the speed of the starter-generator is equal to or greater than the second reference speed, the controller may stop the fast charging of the battery.

The method of controlling charging of the vehicle battery may further include when the controller determines that the motor position sensor does not have failure, determining, by the controller, a rotation direction of the drive motor according to the output signal of the motor position sensor, in which when a rotation direction of the drive motor is a second direction corresponding to a reverse direction of the vehicle, the controller may stop the fast charging of the battery.

The method of controlling charging of the vehicle battery may further include when the controller determines that the motor position sensor does not have failure, determining, by the controller, a rotation direction of the drive motor according to the output signal of the motor position sensor, in which when the rotation direction of the drive motor is a first direction corresponding to a forward direction of the vehicle, the controller may engage the engine clutch, when the rotation of the drive motor does not stop after the engine clutch is engaged, the controller may be configured to determine whether a speed of a starter-generator connected to the engine is equal to or greater than a first reference speed for controlling generation, and when the speed of the starter-generator is less than the first reference speed, the controller may maintain the fast charging for the battery.

Various aspects of the present invention are directed to providing a device configured for controlling charging of a vehicle battery, the device including: an engine clutch which is configured for connecting or disconnecting an engine of a vehicle and a drive motor of the vehicle; and a controller which makes the battery that supplies power to the drive motor start to be charged with a boosted voltage higher than a voltage of a fast charger by controlling a switch connecting a drive motor and a fast charger and a switch of an inverter driving the drive motor, in which the controller is configured to determine whether a motor position sensor has failure according to an output signal of the motor position sensor which detects a position of the drive motor, the controller may engage the engine clutch when the motor position sensor has the failure, and the controller may maintain fast charging for the battery when a rotation of the drive motor stops after the engine clutch is engaged.

When the rotation of the drive motor does not stop after the engine clutch is engaged, the controller may be configured to determine whether a speed of a starter-generator connected to the engine is equal to or greater than a first reference speed for controlling generation, and when the speed of the starter-generator is less than the first reference speed, the controller may maintain the fast charging for the battery.

Before the determining whether the speed of the starter-generator is equal to or greater than the first reference speed, the controller may be configured to determine a rotation direction of the starter-generator according to an output signal of a generator position sensor that detects a position of the starter-generator, and when the rotation direction of the starter-generator is a direction corresponding to a reverse direction of the vehicle, the controller may stop the fast charging of the battery.

When the speed of the starter-generator is equal to or greater than the first reference speed, the controller may charge the battery by controlling the starter-generator, and maintain the fast charging of the battery.

When the battery is charged by the starter-generator, the controller may be configured to determine whether the speed of the starter-generator is equal to or greater than a second reference speed for stopping control of generation, and when the speed of the starter-generator is equal to or greater than the second reference speed, the controller may stop the fast charging of the battery.

When the motor position sensor does not have failure, the controller may be configured to determine a rotation direction of the drive motor according to the output signal of the motor position sensor, and when a rotation direction of the drive motor is a second direction corresponding to a reverse direction of the vehicle, the controller may stop the fast charging of the battery.

When the motor position sensor does not have failure, the controller may be configured to determine a rotation direction of the drive motor according to the output signal of the motor position sensor, when the rotation direction of the drive motor is a first direction corresponding to a forward direction of the vehicle, the controller may engage the engine clutch, when the rotation of the drive motor does not stop after the engine clutch is engaged, the controller may be configured to determine whether a speed of a starter-generator connected to the engine is equal to or greater than a first reference speed for controlling generation, and when the speed of the starter-generator is less than the first reference speed, the controller may maintain the fast charging for the battery.

The method and the device configured for controlling charging of the vehicle battery according to the exemplary embodiments of the present invention may maintain fast charging of a battery when a driving motor is rotated during fast charging of the battery of a vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
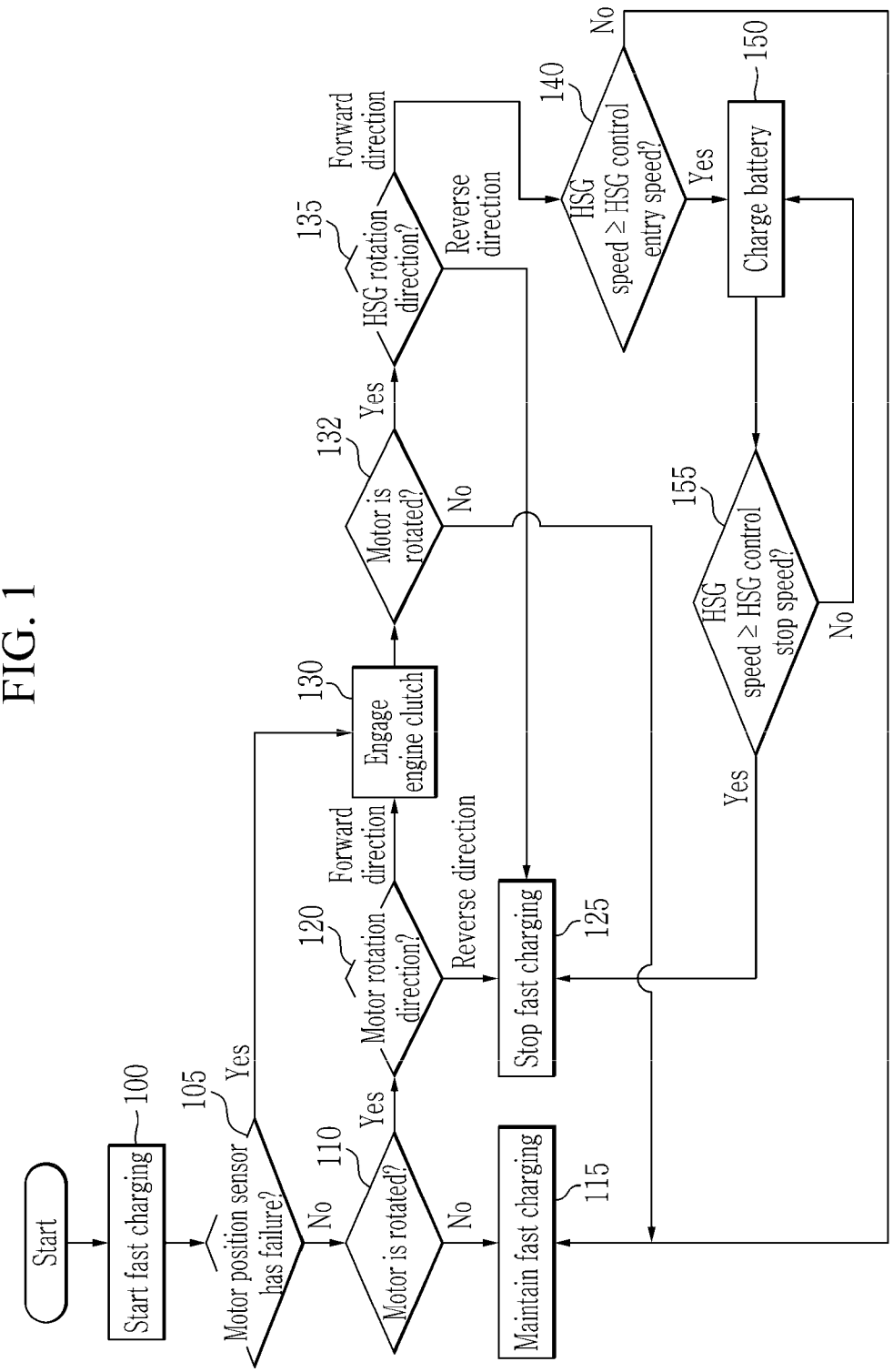
FIG. 1 is a flowchart for describing a method of controlling charging of a battery according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

To fully understand the present invention and the object achieved by carrying out the present invention, reference should be made to the accompanying drawings illustrating various exemplary embodiments of the present invention and the contents disclosed in the accompanying drawings.

Hereinafter, the present invention will be described in detail by describing the exemplary embodiment of the present invention with reference to the accompanying drawings. In the following description of the exemplary embodiment of the present invention, a detailed description of known configurations or functions incorporated herein will be omitted when it is judged that the detailed description may make the subject matter of the present invention unclear. Like reference numerals presented in each drawing designate like elements throughout the specification.

The term used in the exemplary embodiment of the present invention is simply used for describing a specific embodiment and does not intend to limit the present invention. A singular expression includes a plural expression unless it is specifically described to the contrary in the context. In the exemplary embodiment, it should be appreciated that terms "including" and "having" are intended to designate the existence of characteristics, numbers, steps, operations, constituent elements, and components described in the specification or a combination thereof, and do not exclude a possibility of the existence or addition of one or more other characteristics, numbers, steps, operations, constituent elements, and components, or a combination thereof in advance.

Throughout the present specification, when it is described that an element is "coupled" to another element, the element may be "directly coupled" to the another element or "electrically coupled" to the another element a yet another element interposed therebetween.

All terms used herein including technical or scientific terms have the same meanings as meanings which are generally understood by those skilled in the art to which various exemplary embodiments of the present invention pertains unless they are differently defined. Terms defined in generally used dictionary shall be construed to have meanings matching those in the context of a related art, and shall not be construed as ideal or excessively formal meanings unless they are clearly defined in the present specification.

An electric vehicle according to the related art boosts a low charging voltage and charges a battery of a vehicle fast by use of a drive motor, and an inverter that supplies power to the drive motor, which are the components of the vehicle.

When the fast charging is performed on the battery, the inverter may be incorrectly controlled, causing the drive motor to rotate, resulting in the speed of the drive motor. Accordingly, whether the speed of the drive motor is generated may be checked by use of a sensor that detects a location of the drive motor. When the sensor has failure, the fast charging of the battery may be interrupted for safety or protecting hardware, such as the drive motor.

Figure 2:
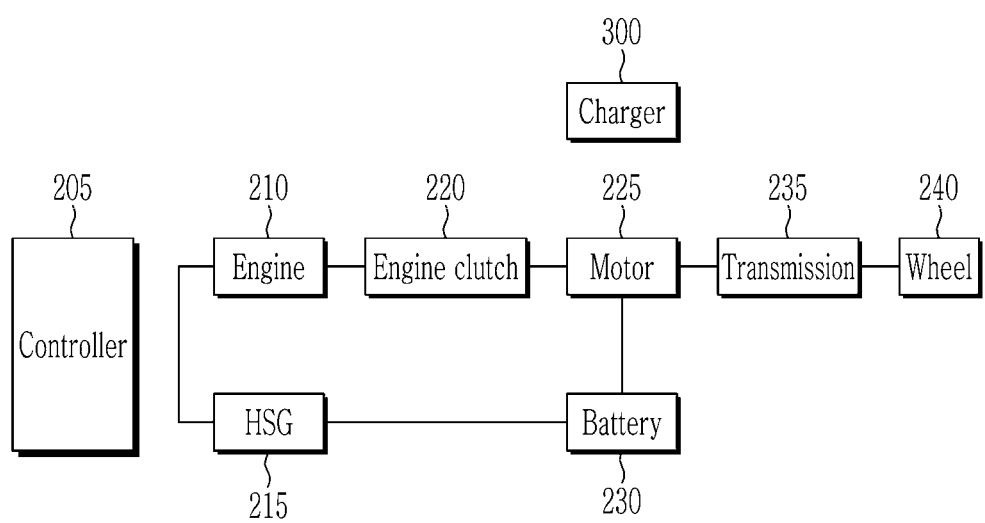
FIG. 2 is a block diagram illustrating a device configured for controlling charging of a vehicle battery to which the method of controlling the charging of the vehicle battery illustrated in FIG. 1 is applied.
Figure 3:
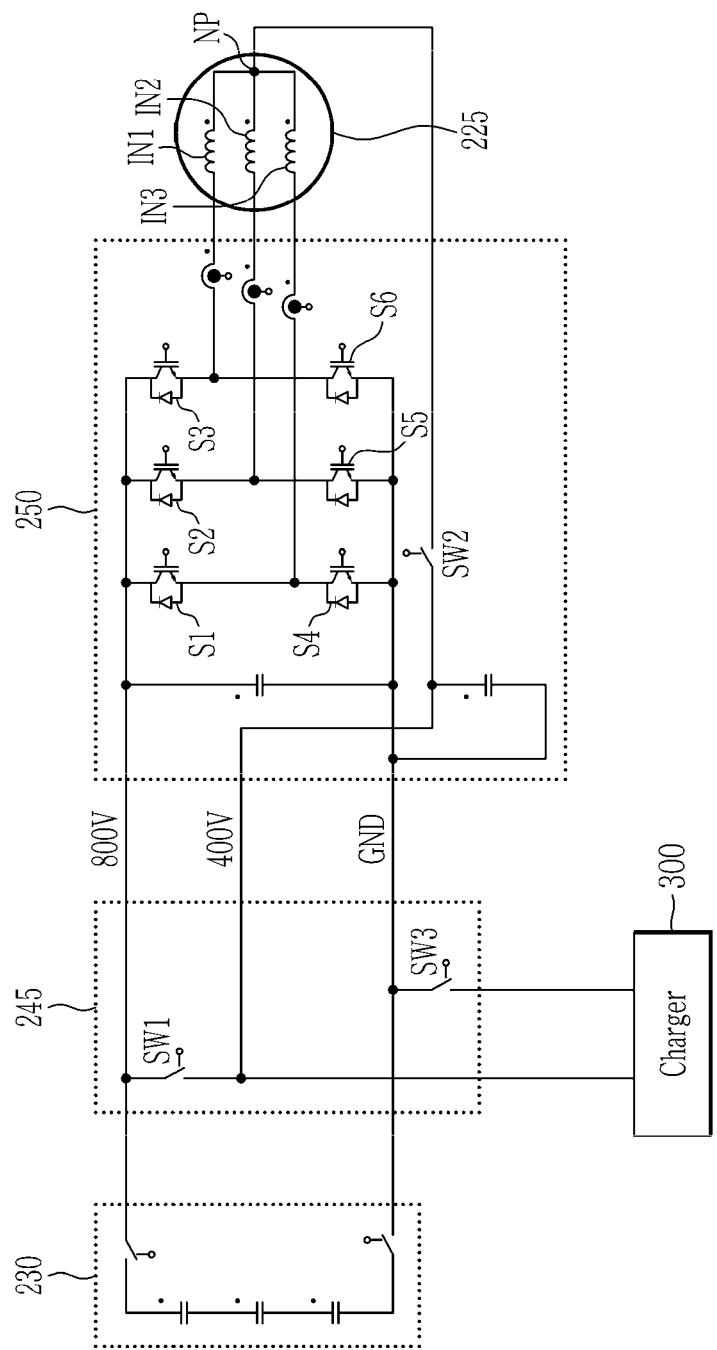
FIG. 3 is a diagram illustrating a fast charger which performs fast charging on the battery illustrated in FIG. 2.

FIG. 1 is a flowchart for describing a method of controlling charging of a battery according to various exemplary embodiments of the present invention. FIG. 2 is a block diagram illustrating a device configured for controlling charging of a vehicle battery to which the method of controlling the charging of the vehicle battery illustrated in FIG. 1 is applied. FIG. 3 is a diagram illustrating a fast charger which performs fast charging on the battery illustrated in FIG. 2.

Referring to FIG. 1, FIG. 2, and FIG. 3, in a starting operation S100, a controller 205 may make a battery 230, which supplies power to a drive motor 225, start to be charged with a higher boosted voltage (for example, 800 V) than a voltage (for example, 400 V) of a fast charger 300 by controlling switches (for example, SW3, SW2, and SW1) which connects the drive motor 225 and the fast charger 300 of the vehicle and a switch S1, S2, S3, S4, S4, S5, or S6 of an inverter 250, which drives the drive motor. The switch of the inverter 250 may be an insulated gate bipolar transistor, and the fast charger 300 may be disposed outside the vehicle.

An exemplary embodiment of an operation of the fast charging for the battery will be described below with reference to FIG. 3.

The second switch SW2 of the invertor 250 which connects an anode terminal that transmits the voltage of 400 V of the fast charger 300 and a neutral point NP of the drive motor 225 may be turned on by the controller 205, and the third switch SW3 of a junction box 245 which connects a cathode terminal of the fast charger 300, a cathode terminal of the battery 230, and a cathode terminal of the inverter 250 may be turned on by the controller 205.

When the second switch SW2 and the third switch SW3 are turned on and the switch (for example, S4) of the inverter 250 is sequentially opened, closed, and opened by the controller 205, the boosted voltage may be charged in the battery 230 by an inductor (for example, IN3) of the drive motor 225, a diode of the switch (for example, S1) of the inverter 250, and a capacitor connected between both terminals of the battery 230. That is, the boosted voltage may be charged in the battery 230 by the inverter 250 used as a boost converter and the drive motor 225. The technology for charging the battery 230 with the boosted voltage by the inverter 250 and the drive motor 225 may be the publicly known technology.

As illustrated in FIG. 2, the vehicle may include the controller 205, an engine 210, a starter-generator (or hybrid starter & generator) 215, an engine clutch 220, the drive motor 225, such as an electric motor, the battery 230, a transmission 235, and driving wheels 240 that are vehicle wheels.

The vehicle is a plug-in hybrid electric vehicle (PHEV), and may use the engine 210 and the drive motor 225 as power sources, and the engine clutch is present between the drive motor 225 and the engine 210, so that the vehicle is operated in an electric vehicle (EV) mode in which the vehicle travels by the drive motor 225 in the state where the engine clutch 220 is opened, and the vehicle is operated in a hybrid electric vehicle (HEV) mode in which the vehicle may travel by both the drive motor 225 and the engine 210 in the state where the engine clutch 220 is closed.

The vehicle may include a powertrain in a transmission mounted electric device method in which the drive motor 225 and the transmission 235 are attached. In the vehicle, revolutions per minute (RPM) of the engine may be raised through the start of the HSG 215, power transmission and cut-off of the engine 210 may be performed through joining (engagement) and disconnection of the engine clutch 220, and driving force may be generated in the wheels 240 through a power transmission system than may include the transmission 235.

The controller 250 may control the entire operations of the vehicle as an electronic control unit (ECU). The controller 205 may be one or more microprocessors operated by a program (control logic) or hardware (for example, a microcomputer) including the microprocessor, and the program may include a series of instructions for performing a method of controlling charging of a battery of a vehicle according to various exemplary embodiments of the present invention. The instruction may be stored in a memory of the vehicle.

The controller 205 may include a hybrid control unit (HCU), a motor control unit (MCU), an engine control unit (ECU), and a transmission control unit (TCU).

The HCU may control the start of the engine through the control of the HSG 215 when the engine 210 stops. The HCU is the top-level controller, and may integrally control controllers, such as a motor control unit (MCU) connected to a network, such as a controller area network (CAN) which is a vehicle network, and control the overall operation of the vehicle.

The MCU may control the HSG 215 and the drive motor 225, and include the inverter 250. The MCU may allow the drive motor 225 to be driven with an area having maximum efficiency by controlling output torque of the drive motor 225 according to a control signal output from the HCU through the network.

The ECU may control the torque of the engine 210. The ECU may make optimum torque be output by controlling an operating point of the engine 210 according to the control signal output from the HCU through the network. The TCU may control the operation of the transmission 235.

The engine 210 may include any one of a diesel engine, a gasoline engine, an LPG engine, and an LNG engine, and may output torque at the operating point according to the control signal output from the ECU to appropriately maintain the driving force combination with the drive motor 225 in the HEV mode.

The HSG 215 is operated as an electric motor or a generator, and may be operated as an electric motor according to the control signal output from the MCU to execute starting-on of the engine 210, and may be operated as a generator in the state where the engine 210 maintains the starting-on to generate a voltage, and provide the battery 230 with the generated voltage as a charging voltage through the inverter. The HSG 215 may be connected to the engine 210 through a belt.

The engine clutch 220 may be disposed (mounted) between the engine 210 and the drive motor 225 to intermittently transmit power (power connection) to provide the operation in the EV mode and the HEV mode. The operation of the engine clutch 220 may be controlled by the controller 205.

The drive motor 225 may be operated by a three-phase alternating current voltage output from the MCU to generate torque.

The battery 230 is formed of a plurality of unit cells, and may be implemented with a high-voltage battery of, for example, 800 Volt, for providing power to the drive motor 225 that provides driving force to the wheels 240 or the HSG 215.

The transmission 235 may be implemented with a multiple speed transmission or multi-stage transmission, such as an automatic transmission or a dual clutch transmission (DCT), and an engagement element and a disengagement element are operated by operation of hydraulic pressure under the control of the TCU to combine (select) a predetermined gear shifting stage. The transmission 235 may transmit or block the transmission of driving force of the engine 210 and/or the drive motor 225 to the wheels 240.

The device configured for controlling charging of the battery of the vehicle may include the controller 205, the engine 210, the HSG 215, the engine clutch 220, and the drive motor 225.

According to operation 105 illustrated in FIG. 1, the controller 205 may determine whether a motor position sensor has failure according to an output signal of the motor position sensor that detects a position of the drive motor 225 (for example, a rotation position of a rotor of the drive motor 225). For example, when the rotation position of the rotor of the drive motor 225 is changed, but the output signal of the motor position sensor that indicates a change in the rotation position of the rotor is not generated, when the output signal of the motor position sensor is not input to the controller 205 due to disconnection, or when the output signal of the motor position sensor is input to the controller as a signal other than a normal range, the controller 205 may determine that the motor position sensor has failure.

The method of controlling the charging of the vehicle battery which is the process when it is determined that the motor position sensor does not have failure may proceed to operation 110, and the method of controlling the charging of the vehicle battery which is the process when it is determined that the motor position sensor has failure may proceed to operation 130.

According to the operation 110, the controller 205 may determine whether the drive motor 225 rotates based on the output signal of the motor position sensor.

The method of controlling the charging of the vehicle battery which is the process when the drive motor 225 does not rotate may proceed to operation 115, and the method of controlling the charging of the vehicle battery which is the process when the drive motor 225 rotates may proceed to operation 120.

According to the operation 115, the controller 205 may maintain fast charging for the battery 230.

According to the operation 120, the controller 205 may decide or determine a rotation direction of the drive motor 225 based on the output signal of the motor position sensor.

According to the operation 125, when the rotation direction of the drive motor 225 is a second direction (or a reverse direction of the drive motor) corresponding to a reverse direction of the vehicle, the controller 205 may stop the fast charging of the battery 230.

According to the operation 130, when it is determined that the motor position sensor has failure and the rotation direction of the drive motor 225 is a first direction (or a forward direction of the drive motor) corresponding to a forward direction of the vehicle, the controller 205 may engage (join) the engine clutch 220 that connects or disconnects the engine 210 and the drive motor 225. When the engine clutch 220 is engaged, all of the drive motor 225, the engine 210, and the HSG 215 may be connected to one shaft. Accordingly, when it is determined that the motor position sensor has failure, the position of the drive motor 225 may be measured by use of an output signal of a generator position sensor that detects a position of the HSG 215 (for example, the rotation position of the rotor of the HSG). The rotation of the HSG 215 may also be detected (measured) by the detection of the rotation of the engine 210 connected to the HSG. Furthermore, when the engine clutch 220 is engaged, the engine 210 may act as a load to cause a decrease in a rotation speed of the drive motor 225 or stop of the rotation of the drive motor 225. According to operation 132, the controller 205 may determine whether the drive motor 225 rotates. When the rotation of the drive motor 225 is stopped, the method of controlling the charging of the vehicle battery which is the process may proceed to the operation 115.

According to operation 135, when the engine clutch 220 is engaged and then the rotation of the drive motor 225 is not stopped in the operation 132, the controller 205 may decide or determine the rotation direction of the HSG based on the output signal of the generator position sensor that detects the position of the HSG 215.

The method of controlling the charging of the vehicle battery which is the process when the rotation direction of the HSG 215 is the second direction corresponding to the reverse direction of the vehicle (or the reverse direction of the generator) may proceed to the operation 125 for preventing the failure of the engine 210, and the method of controlling the charging of the vehicle battery which is the process when the rotation direction of the HSG 215 is the first direction corresponding to the forward direction of the vehicle (or the forward direction of the generator) may proceed to operation 140.

According to the operation 140, the controller 205 may determine whether a speed of the HSG 215 connected to the engine 210 is equal to or greater than a first reference speed (a control entry speed of the HSG) for the controlling generation. For example, the speed of the HSG 215 may be detected by the generator position sensor, and the first reference speed may be determined by a test (or an experiment) and be stored in the memory of the vehicle.

The method of controlling the charging of the vehicle battery which is the process when the speed of the HSG 215 is less than the first reference speed may proceed to the operation 115, and the method of controlling the charging of the vehicle battery which is the process when the speed of the HSG 215 is equal to or greater than the first reference speed may proceed to operation 150.

According to the operation 150, the controller 205 may charge the battery 230 by controlling the HSG 215 to perform generation (or control the HSG to generate reverse torque), and maintain the fast charging of the battery. After the battery 230 is charged, the rotation of the drive motor 225 connected to the HSG 215 may be stopped.

According to the operation 155, when the battery 230 is charged by the HSG 215, the controller 205 may determine whether the speed of the HSG is equal to or greater than a second reference speed (a control entry speed of the HSG) for stopping the control of generation. For example, the second reference speed may be determined by a test (or an experiment), and be stored in the memory of the vehicle.

The method of controlling the charging of the vehicle battery which is the process when the speed of the HSG 215 is less than the second reference speed may proceed to the operation 150, and the method of controlling the charging of the vehicle battery which is the process when the speed of the HSG 215 is equal to or greater than the second reference speed may proceed to the operation 125 for safety.

Figure 4:
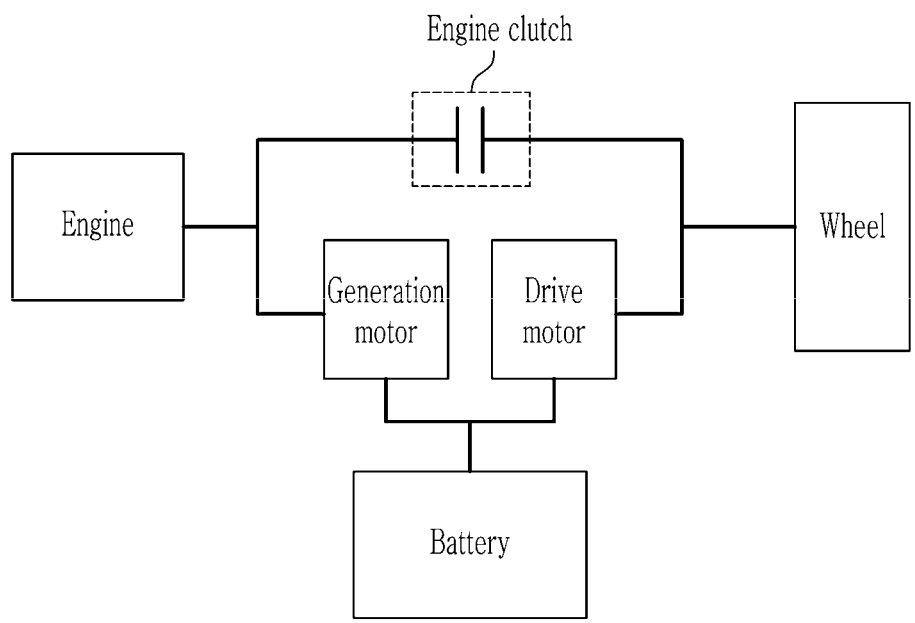
FIG. 4 is a diagram illustrating a hybrid vehicle to which the method of controlling the charging of the vehicle battery illustrated in FIG. 1 is applied.

The method of controlling the charging of the vehicle battery according to the exemplary embodiment of the present invention may also be applied to a hybrid vehicle, such as an intelligent multi-mode drive (i-MMD) system illustrated in FIG. 4. The i-MMD system may have a similar structure to the structure of the vehicle including the device configured for controlling the charging of the vehicle battery illustrated in FIG. 2.

Figure 5:
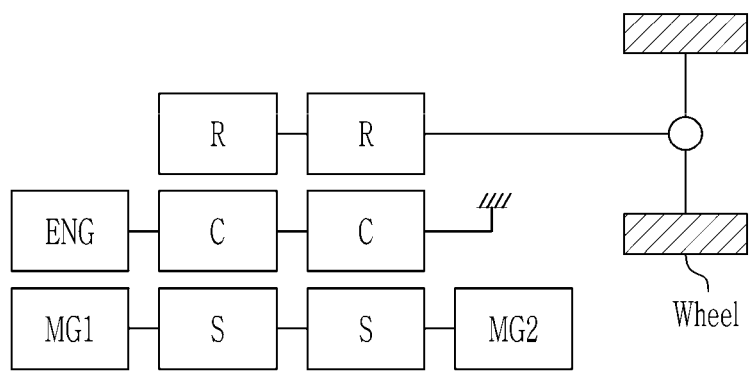
FIG. 5 is a diagram illustrating another example of a hybrid vehicle to which the method of controlling the charging of the vehicle battery illustrated in FIG. 1 is applied.

The method of controlling the charging of the vehicle battery according to the exemplary embodiment of the present invention may also be applied to a hybrid vehicle, such as a power split system (or a power split device) illustrated in FIG. 5. The power split system may perform a similar function to the function of the vehicle including the device configured for controlling the charging of the vehicle battery illustrated in FIG. 2.

The power split system may include an engine ENG performing a similar function to the function of the engine 210, a first motor MG1 performing a similar function to the function of the HSG 215, a drive motor MG2 which is a second motor performing a similar function to the function of the drive motor 225, and a first planetary gearing device and a second planetary gearing device performing similar functions to the functions of the engine clutch 220 and the transmission 235.

A ring gear R of the first planetary gearing device may be connected to a ring gear R of the second planetary gearing device connected to wheels, a planet carrier of the first planetary gearing device may be connected to the engine ENG, and a sun gear of the first planetary gearing device may be connected to the first motor MG1. A planet carrier of the second planetary gearing device may be connected to a housing of a transmission including the first planetary gearing device and the second planetary gearing device, and a sun gear of the second planetary gearing device may be connected to the second motor MG2.

The constituent element, " . . . unit", a block, or a module used in the exemplary embodiment of the present invention may be implemented by software, such as a task, class, subroutine, process, object, execution thread, and program performed in a predetermined area of a memory, or hardware, such as field-programmable gate array (FPGA) or an application-specific integrated circuit (ASIC), and may also be implemented by a combination of the software and the hardware. The constituent element, " . . . unit" or the like may also be included in a computer readable storage medium, and a part thereof may be distributed in the plurality of computers.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method disclosed in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a control device, and the control device may be configured by multiple control devices, or an integrated single control device.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method of controlling charging of a battery, the method comprising:
   making, by a controller, the battery that supplies power to a drive motor start to be charged with a boosted voltage higher than a voltage of a fast charger by controlling a switch connecting the drive motor and the fast charger of a vehicle and a switch of an inverter driving the drive motor, for fast charging of the battery;
   determining, by the controller, whether a motor position sensor has failure according to an output signal of the motor position sensor which detects a position of the drive motor;
   engaging, by the controller, an engine clutch that is configured to connect or disconnect the engine of the vehicle and the drive motor, when the controller determines that the motor position sensor has the failure; and
   maintaining, by the controller, the fast charging for the battery when the controller determines that a rotation of the drive motor stops after the engine clutch is engaged.

2. The method of claim 1, further including:
   when the controller determines that the rotation of the drive motor does not stop after the engine clutch is engaged, determining, by the controller, whether a speed of a starter-generator connected to the engine is equal to or greater than a first reference speed for controlling generation, and
   when the controller determines that the speed of the starter-generator is less than the first reference speed, maintaining, by the controller, the fast charging for the battery.

3. The method of claim 2, further including:
   before the determining whether the speed of the starter-generator is equal to or greater than the first reference speed, determining, by the controller, a rotation direction of the starter-generator according to an output signal of a generator position sensor that detects a position of the starter-generator,
   wherein when the controller determines that the rotation direction of the starter-generator is a direction corresponding to a reverse direction of the vehicle, the controller is configured to stop the fast charging of the battery.

4. The method of claim 2, further including:
   when the controller determines that the speed of the starter-generator is equal to or greater than the first reference speed, charging, by the controller, the battery by controlling the starter-generator, and maintaining the fast charging of the battery.

5. The method of claim 4, further including:
   when the battery is charged by the starter-generator, determining, by the controller, whether the speed of the starter-generator is equal to or greater than a second reference speed for stopping control of generation,
   wherein when the controller determines that the speed of the starter-generator is equal to or greater than the second reference speed, the controller is configured to stop the fast charging of the battery.

6. The method of claim 5,
   wherein when the controller determines that the speed of the starter-generator is lower than the second reference speed, the controller is configured to maintain the fast charging of the battery.

7. The method of claim 2, further including:
   before the determining whether the speed of the starter-generator is equal to or greater than the first reference speed, determining, by the controller, a rotation direction of the starter-generator according to an output signal of a generator position sensor that detects a position of the starter-generator,
   when the controller determines that the rotation direction of the starter-generator is a direction corresponding to a forward direction of the vehicle, determining, by the controller, whether the speed of the starter-generator connected to the engine is equal to or greater than the first reference speed for controlling generation.

8. The method of claim 1, further including:
   when the controller determines that the motor position sensor does not have failure, determining, by the controller, a rotation direction of the drive motor according to the output signal of the motor position sensor,
   wherein when the controller determines that the rotation direction of the drive motor is a direction corresponding to a reverse direction of the vehicle, the controller is configured to stop the fast charging of the battery.

9. The method of claim 1, further including:
   when the controller determines that the motor position sensor does not have failure, determining, by the controller, a rotation direction of the drive motor according to the output signal of the motor position sensor,
   wherein when the controller determines that the rotation direction of the drive motor is a direction corresponding to a forward direction of the vehicle, the controller is configured to engage the engine clutch,
   when the controller determines that the rotation of the drive motor does not stop after the engine clutch is engaged, the controller is configured to determine whether a speed of a starter-generator connected to the engine is equal to or greater than a reference speed for controlling generation, and
   when the controller determines that the speed of the starter-generator is less than the reference speed, the controller is configured to maintain the fast charging for the battery.

10. A non-transitory computer readable storage medium on which a program for performing the method of claim 1 is recorded.

11. A device for controlling charging of a battery, the device comprising:
    an engine clutch which is configured for connecting or disconnecting an engine of a vehicle and a drive motor of the vehicle; and
    a controller which makes the battery that supplies power to the drive motor start to be charged with a boosted voltage higher than a voltage of a fast charger by controlling a switch connecting the drive motor and the fast charger of the vehicle and a switch of an inverter driving the drive motor, for fast charging of the battery, wherein the controller is configured to determine whether a motor position sensor has failure according to an output signal of the motor position sensor which detects a position of the drive motor, wherein the controller is configured to engage the engine clutch when the controller determines that the motor position sensor has the failure, and wherein the controller is configured to maintain the fast charging for the battery when the controller determines that a rotation of the drive motor stops after the engine clutch is engaged.

12. The device of claim 11, wherein when the controller determines that the rotation of the drive motor does not stop after the engine clutch is engaged, the controller is configured to determine whether a speed of a starter-generator connected to the engine is equal to or greater than a first reference speed for controlling generation, and when the controller determines that the speed of the starter-generator is less than the first reference speed, the controller is configured to maintain the fast charging for the battery.

13. The device of claim 12, wherein before the determining whether the speed of the starter-generator is equal to or greater than the first reference speed, the controller is configured to determine a rotation direction of the starter-generator according to an output signal of a generator position sensor that detects a position of the starter-generator, and when the controller determines that the rotation direction of the starter-generator is a direction corresponding to a reverse direction of the vehicle, the controller is configured to stop the fast charging of the battery.

14. The device of claim 12, wherein before the determining whether the speed of the starter-generator is equal to or greater than the first reference speed, the controller is configured to determine a rotation direction of the starter-generator according to an output signal of a generator position sensor that detects a position of the starter-generator, and when the controller determines that the rotation direction of the starter-generator is a direction corresponding to a forward direction of the vehicle, the controller is configured to determine whether the speed of the starter-generator connected to the engine is equal to or greater than the first reference speed for controlling generation.

15. The device of claim 12, wherein when the controller determines that the speed of the starter-generator is equal to or greater than the first reference speed, the controller is configured to charge the battery by controlling the starter-generator, and to maintain the fast charging of the battery.

16. The device of claim 15, wherein when the battery is charged by the starter-generator, the controller is configured to determine whether the speed of the starter-generator is equal to or greater than a second reference speed for stopping control of generation, and when the controller determines that the speed of the starter-generator is equal to or greater than the second reference speed, the controller is configured to stop the fast charging of the battery.

17. The device of claim 16, wherein when the controller determines that the speed of the starter-generator is lower than the second reference speed, the controller is configured to maintain the fast charging of the battery.

18. The device of claim 11, wherein when the controller determines that the motor position sensor does not have failure, the controller is configured to determine a rotation direction of the drive motor according to the output signal of the motor position sensor, and when the controller determines that rotation direction of the drive motor is a direction corresponding to a reverse direction of the vehicle, the controller is configured to stop the fast charging of the battery.

19. The device of claim 11, wherein when the controller determines that the motor position sensor does not have failure, the controller is configured to determine a rotation direction of the drive motor according to the output signal of the motor position sensor, when the controller determines that the rotation direction of the drive motor is a direction corresponding to a forward direction of the vehicle, the controller is configured to engage the engine clutch, when the controller determines that the rotation of the drive motor does not stop after the engine clutch is engaged, the controller is configured to determine whether a speed of a starter-generator connected to the engine is equal to or greater than a reference speed for controlling generation, and when the controller determines that the speed of the starter-generator is less than the reference speed, the controller is configured to maintain the fast charging for the battery.

* * * * *